(12) United States Patent
Jones et al.

(10) Patent No.: US 7,338,224 B2
(45) Date of Patent: Mar. 4, 2008

(54) ERGONOMIC KEYBOARD APPARATUS

(75) Inventors: Gregory Glenn Jones, Seattle, WA (US); Hugh Edward McLoone, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 20 days.

(21) Appl. No.: 11/145,040

(22) Filed: Jun. 3, 2005

(65) Prior Publication Data
US 2006/0275069 A1 Dec. 7, 2006

(51) Int. Cl.
*B41J 5/08* (2006.01)

(52) U.S. Cl. ............ 400/489; 400/488; 400/492; 341/22; 345/168; 235/145 R

(58) Field of Classification Search .......... None
See application file for complete search history.

(56) References Cited

U.S. PATENT DOCUMENTS

| | | | | |
|---|---|---|---|---|
| 4,402,624 A | * | 9/1983 | Stahl et al. ............ | 400/681 |
| 5,178,477 A | * | 1/1993 | Gambaro ............... | 400/489 |
| 5,372,441 A | * | 12/1994 | Louis ................... | 400/489 |
| 5,397,189 A | * | 3/1995 | Minogue ............... | 400/489 |
| 5,564,844 A | * | 10/1996 | Patterson et al. ....... | 400/492 |
| 5,660,488 A | * | 8/1997 | Miller .................. | 400/486 |
| 5,673,040 A | * | 9/1997 | Hargreaves et al. ..... | 341/22 |
| 5,689,253 A | * | 11/1997 | Hargreaves et al. ..... | 341/22 |
| 5,731,808 A | * | 3/1998 | Gaither ................ | 345/168 |
| 6,379,060 B1 | * | 4/2002 | Louis ................... | 400/489 |
| 6,404,621 B2 | * | 6/2002 | Zamora et al. ......... | 361/680 |
| 6,802,662 B1 | * | 10/2004 | Cheng et al. ........... | 400/489 |
| 2001/0048837 A1 | * | 12/2001 | Parkinson ............. | 400/489 |

OTHER PUBLICATIONS

Nakaseko, M. et al., "Studies on Ergonomically Designed Alpha Numeric Keyboards," *The Human Factors Society*, 1985, vol. 27, pp. 175-187.
*Alphanumerische Tastaturen*, 1985 (German language).
American National Standard for Human Factors Engineering of Display Terminal Workstations, *The Human Factor Society*, 1988, 7 pgs.
Human Factors Engineering of Computer Workstations, *Human Factors and Ergonomics Society*, 2002, 11 pages.
Jacobson, M. and McLoone, H., "ErgoMax Model Study", *Microsoft*, 2004.
McLoone, H., "Key Largo: ErgoMax User Research Study II", *Microsoft*, 2004.
LT Tball PS2 Keytronic Keyboard, http://www.keytronic.com/home/products/specs/lttballps2.htm, 2005.
Kinesis Contoured Keyboards, http://www.kinesis-ergo.com/contoured.htm, 2005.

* cited by examiner

*Primary Examiner*—Jill E. Culler
(74) *Attorney, Agent, or Firm*—Woodcock Washburn LLP

(57) ABSTRACT

A plurality of embodiments of improved ergonomic keyboards for interfacing with a user's arms, wrists, hands and fingers in a more natural way, i.e., in ways that are optimally suited to human typing. In various non-limiting embodiments, the invention provides optimal finger pressing angles, provides optimal range(s) for "gable" angling, flattens the outer edges of the gable, thins key patterns of split key arrangements, raises (or lowers) the wrist rest to an optimal position, and/or splits the wrist rest into two (or more) components.

18 Claims, 11 Drawing Sheets

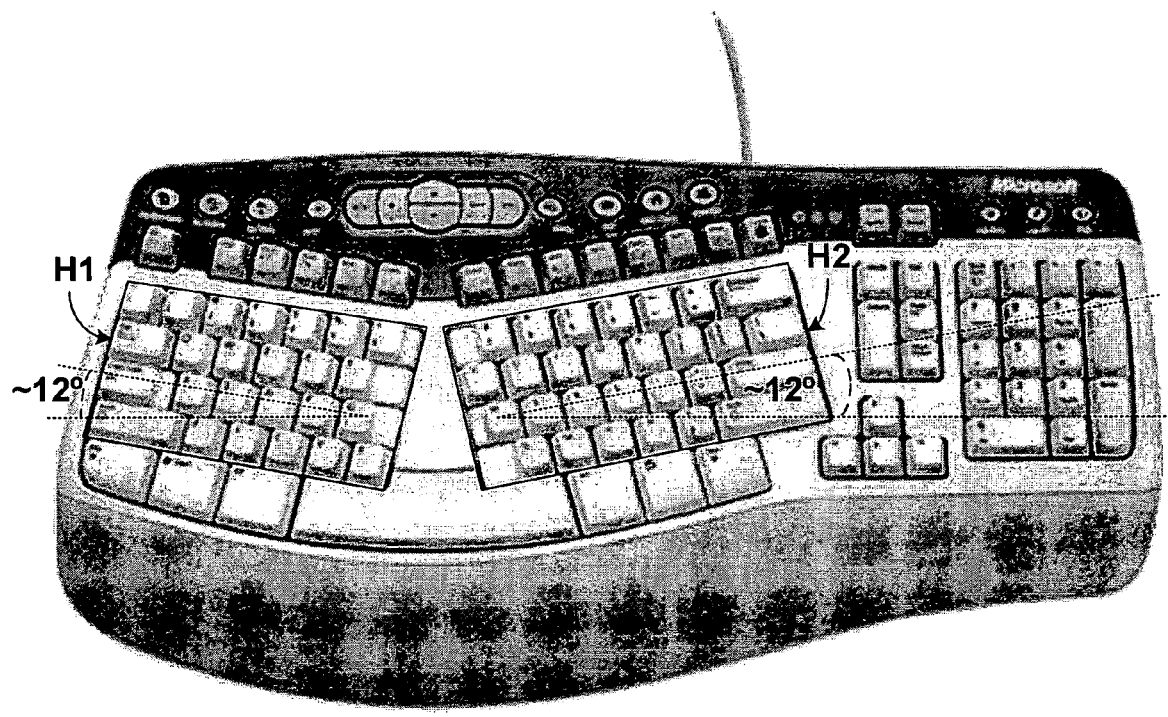
FIG. 1A – Prior Art
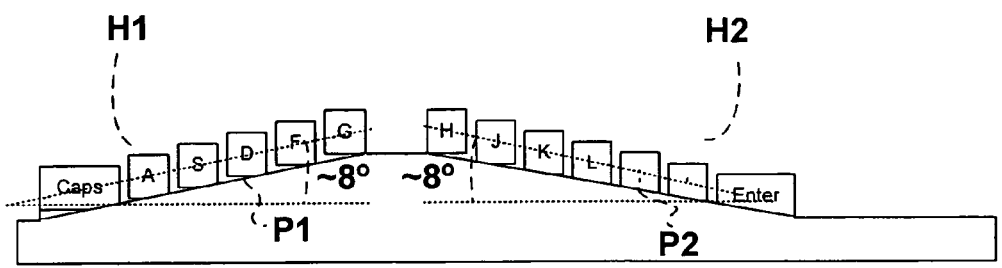
FIG. 1B – Prior Art

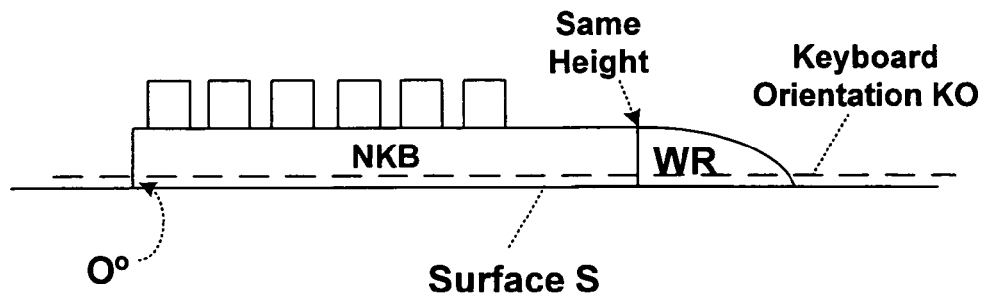
FIG. 1C – Prior Art
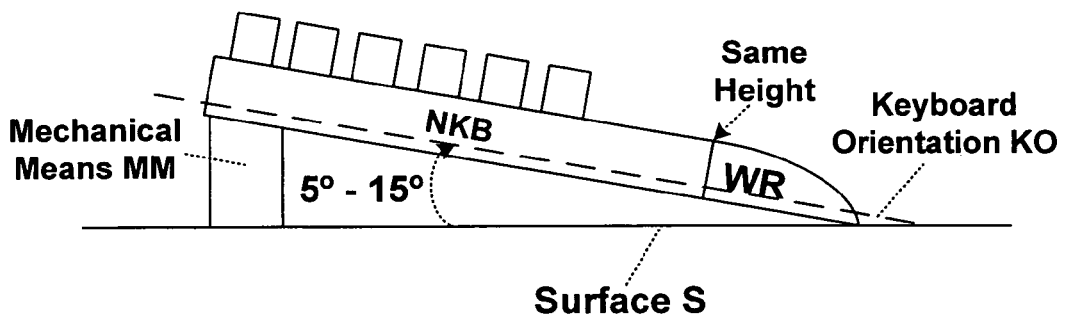
FIG. 1D – Prior Art
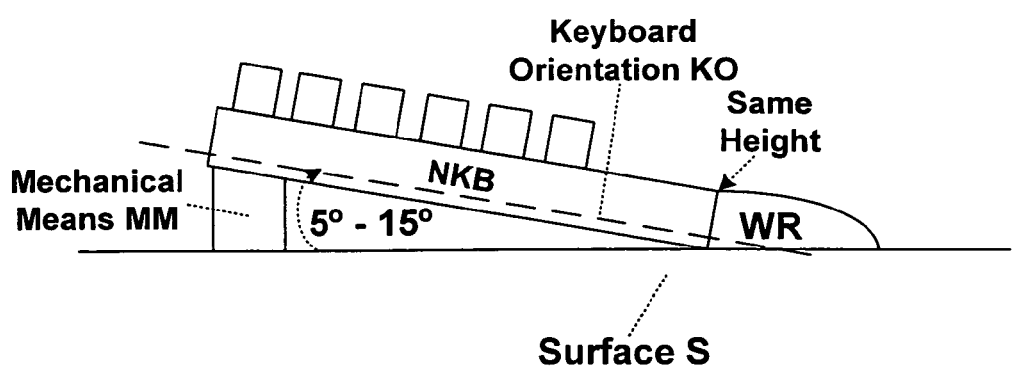
FIG. 1E – Prior Art

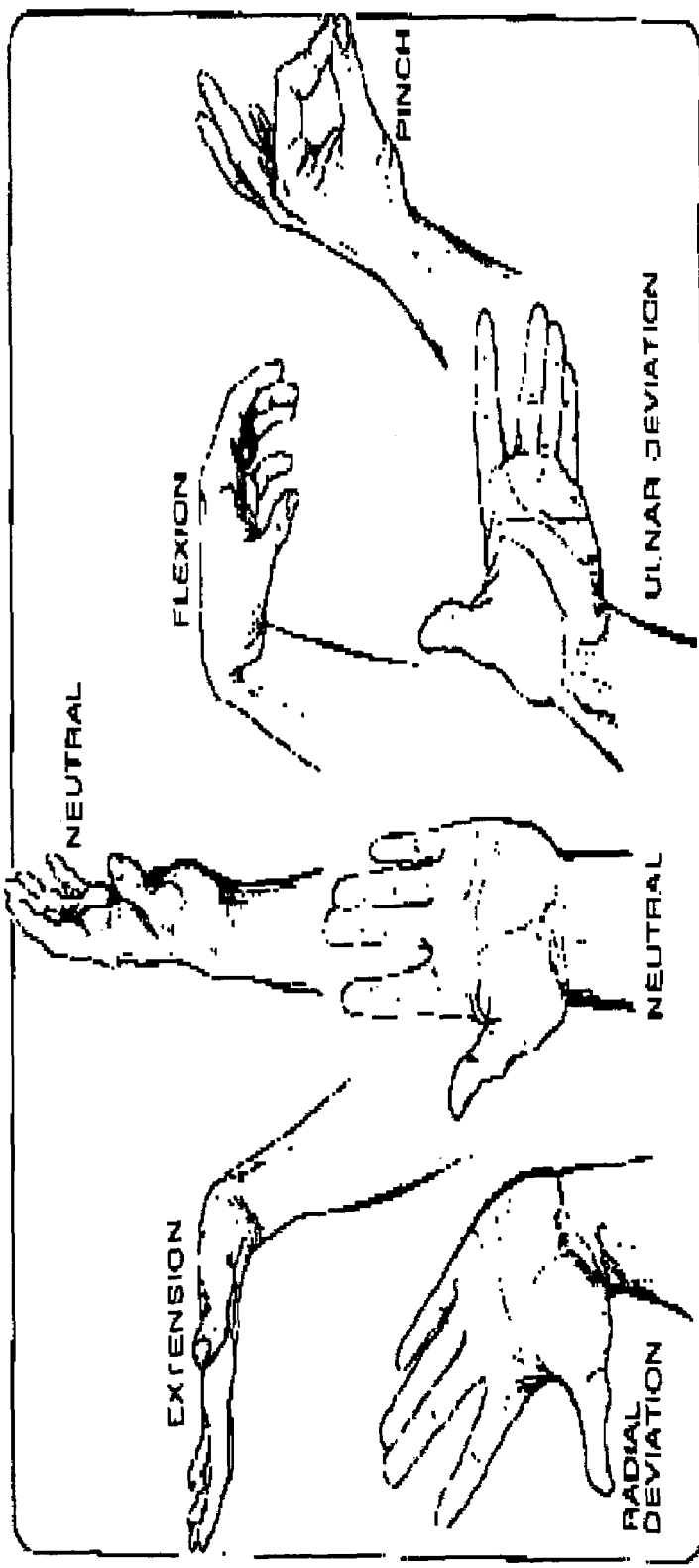
FIG. 1F – Prior Art

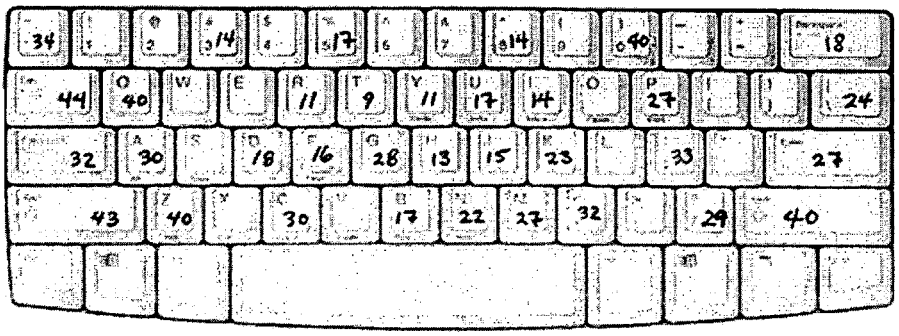
FIG. 3A
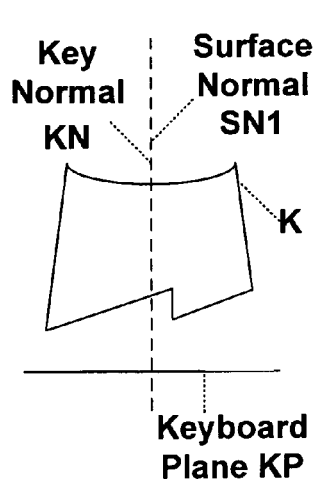 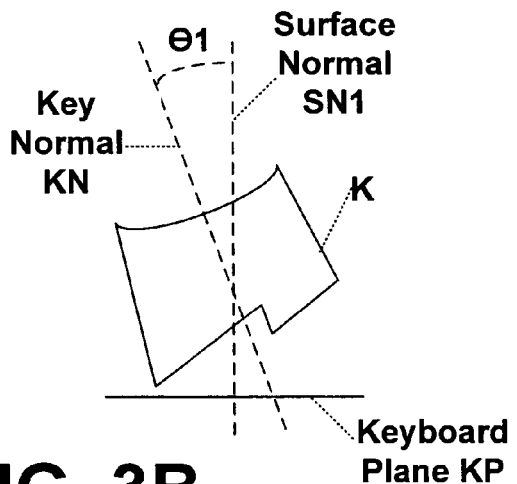
FIG. 3B
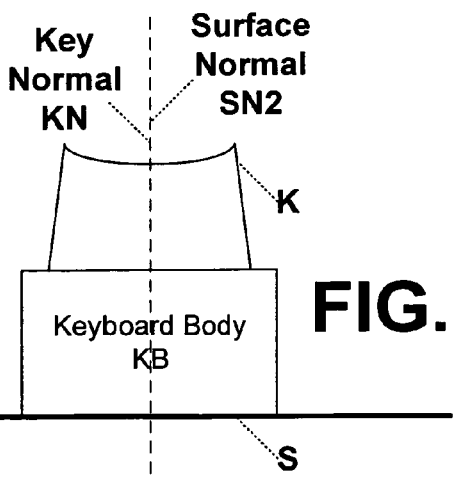 FIG. 3C 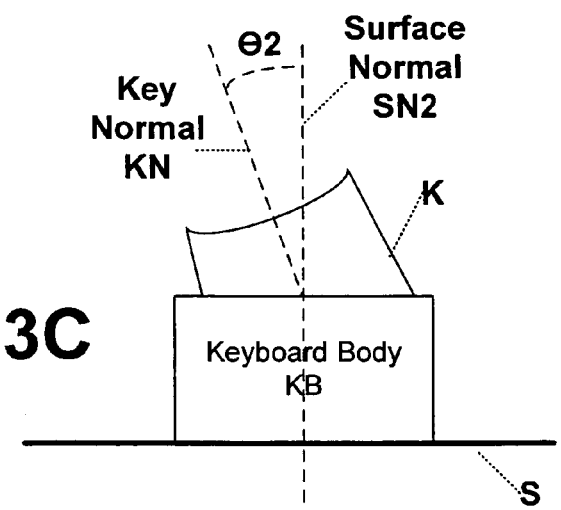

Optional Mechanical Angle Changing Means

Optional Mechanical Angle Changing Means

ERGONOMIC KEYBOARD APPARATUS

TECHNICAL FIELD

The present invention relates to improvements for ergonomic keyboards. More particularly, the invention relates to an improved ergonomic alphanumeric keyboard, such as may be used with a computing device, such as a personal computer, terminal, portable computer, kiosk or the like.

BACKGROUND

There are a number of present keyboard designs that have certain ergonomic features, i.e., features designed and arranged for use by people so that people can interact most efficiently and safely with those features; however, in some cases, such keyboard designs are based on research that is twenty or more years old. See, e.g., M. Nakaseko, E. GrandJean and W. Hunting's "Studies on Ergonomically Designed Alphanumeric Keyboards," The Human Factors Society, Human Factors 175-187 (1985), upon which the ergonomic Microsoft® Natural Keyboard shown in FIG. 1A is based in part.

Ergonomic keyboards thus include structures that are well suited for human preferences as they relate to the peculiar angles and structures of human arms, wrists and hands. For examples of existing ergonomic features, some existing keyboard designs employ a "fixed split ergonomic" keyboard design, wherein the main alphanumeric keys are split into two sections that are angled to be more in keeping with the angles made by the typical arms/wrists/hands of a keyboard user. Such a split design is exemplified by the Microsoft® Natural keyboard (hereinafter the "Natural keyboard" design) as well as other products which follow similar, if not identical, presentation of split keyboard typing areas. The halves H1 and H2 of the exemplary Natural keyboard illustrated in FIG. 1A show the split design of the alphanumeric keys.

As illustrated by FIGS. 1A and 1B, the Natural keyboard is defined by geometries of the split keyboard halves as well as geometries of the keyboard as a whole and in part with respect to various subparts. In terms of the split halves, the main QWERTY typing section is "split" into two halves H1 and H2, each of which is split open at a 12 or 12.5 degree angle for a total split open of 24 or 25 degrees, as illustrated in FIG. 1A.

The two halves H1 and H2 are also vertically tented, or gabled, at an 8 degree angle as illustrated by the isolated side view of a single row of the two halves H1 and H2 of the exemplary Natural keyboard, depicting the presentation of a classical QWERTY row including the keys: Caps Lock, A, S, D, F, G (half H1) and H, J, K, L, :, ' and Enter (half H2). In this regard, as shown in FIG. 1B, the keys of the two halves of the Natural keyboard are kept on the same plane such that one planar surface is offered for all keys on that surface. In this regard, all of the keys of half Hl are presented or positioned on plane P1 (side view shown defined by the line) and all of the keys of half H2 are presented or positioned on plane P2 (side view shown defined by the line).

Additionally, the orientation of an exemplary Natural keyboard NKB as a whole when presented as a surface to a user is such that the keyboard orientation KO may be presented both "flat" (0 degrees to a surface S) as illustrated in FIG. 1C, as well as with a "positive" slope (between 5 and 15 degrees to surface S) as illustrated in FIGS. 1D and 1E. A wrist rest WR may also be included as a part of the keyboard where a user's wrists tend to naturally rest, which may or may not slope along with the rest of the keyboard as shown in FIGS. 1D and 1E, respectively. Such a forward slope of whole keyboard is generally accomplished by the provision of mechanical mechanisms underneath the keyboard body, towards the rear of the keyboard, as shown by exemplary mechanical means MM, such as feet or legs, etc.

As mentioned, the Natural keyboard comes with or without a wrist rest WR (sometimes also called a palm rest). The palm rest may be "fixed" or "removable" in design. In existing designs, the height of the palm rest on Natural keyboard is at the same height as the front edge of the keyboard itself, as illustrated in each of FIGS. 1C to 1E by the arrow to the front edge of the keyboard, showing that the wrist rest edge adjoins the keyboard edge at substantially the same height.

Vern Putz-Anderson et al.'s "Cumulative trauma disorders: A manual for musculoskeletal diseases of the upper limbs," Taylor & Francis (1988) describes some typical motions that the hands undergo. For background purposes, such exemplary motions for a hand are shown and labeled in FIG. 1F, and include neutral position, extension, radial deviation, flexion, ulnar deviation and pinch.

The design goals for the Natural keyboard included improving wrist postures while typing: to reduce pronation, i.e., rotation of the hand and forearm so that the palm faces inwards or downwards (twisting palm over), accomplished in part by the above-described 8 degree gable angle and reducing extension (bending hand backwards) accomplished in part by the above-described whole keyboard slope adjustments and the presence of a fixed palm rest; and reducing ulnar deviation (twisting hand towards little finger) accomplished by the above-described split angle of the two keyboard halves.

While the above mentioned features of the Natural keyboard were an improvement over preexisting keyboards, which tended to place more consideration on the functionality enabled by the keys, further ergonomic improvements are desired over the current Natural keyboard.

SUMMARY

In view of the foregoing, the present invention provides a plurality of embodiments of improved ergonomic keyboards for interfacing with a user's arms, wrists, hands and fingers in a more natural way, i.e., in ways that are optimally suited to human typing. In various non-limiting embodiments, the invention provides optimal finger pressing angles, provides optimal range(s) for "gable" angling, flattens the outer edges of the gable, thins key patterns of split key arrangements, raises (or lowers) the wrist rest to an optimal position, and/or splits the wrist rest into two (or more) components.

Other features of the present invention are described below.

DESCRIPTION OF THE DRAWINGS

The improved ergonomic keyboards of the invention are further described with reference to the accompanying drawings in which:

FIGS. 1A, 1B, 1C, 1D and 1E illustrate exemplary non-limiting prior art ergonomic keyboard designs;

FIG. 1F illustrates exemplary hand motions and some exemplary illustrations and labels for describing the same;

FIGS. 3A, 3B and 3C illustrate exemplary non-limiting structure(s) for or implementation(s) of surface normal key angles in accordance with embodiments of the invention;

DETAILED DESCRIPTION

Overview

As mentioned in the background, the present invention improves on existing geometries of prior art ergonomic keyboards in a new and beneficial ways, considering not only improved wrist postures described above in the background with respect to the Natural keyboard, but also in one aspect, matching finger tip trajectories as fingers strike key cap surfaces while typing and reducing the complex motions to acquire keys that are placed further away as a result of keyboard and key geometry.

In various non-limiting embodiments described in exemplary detail below, the invention selects and provides optimal finger to key pressing angles for keys of an ergonomic keyboard, identifies and provides a more optimal range for "gable" angling, including, but not limited to, a range of 9-16 degrees, flattens the outer edges of the gable, including the identification and provision of separate angling for "between" keys (i.e., keys between flat keys and gable angled keys), thins the key patterns of split key arrangements with more optimal curving of key rows or segments of rows and portions thereof, enables as a first option an adjustable (pivotally or vertically) wrist rest to raise or lower the wrist rest to an optimal position as defined by the user, or enables as a second option the attachment of the wrist rest at an optimal level higher than the front edge of the keyboard, and/or splits the wrist rest into two (or more) components, with (at least) one component for each hand, and positions at least one other portion between the two components for functional purpose.

Exemplary Computing Device

The invention applies to any device wherein it may be desirable to provide input from a keyboard. It should be understood, therefore, that handheld, portable and other computing devices and computing objects of all kinds are contemplated for use in connection with certain embodiments of the present invention, wherever applicable, i.e., anywhere that a device may receive keyed input. Accordingly, the below general purpose remote computer described below in FIG. 2 is but one example, and the present invention may be implemented in connection with any computer.

Although not required, a keyboard of the invention can interface with a computer via an operating system, a service for a device or object, and/or included within application software that operates in connection with keyed input. Software may be described in the general context of computer-executable instructions, such as program modules, being executed by one or more computers, such as client workstations, servers or other devices. Those skilled in the art will appreciate that the ergonomic keyboards of the invention may be utilized with any computer system configurations and protocols for communications of keyboard input with the computer.

Figure 2:
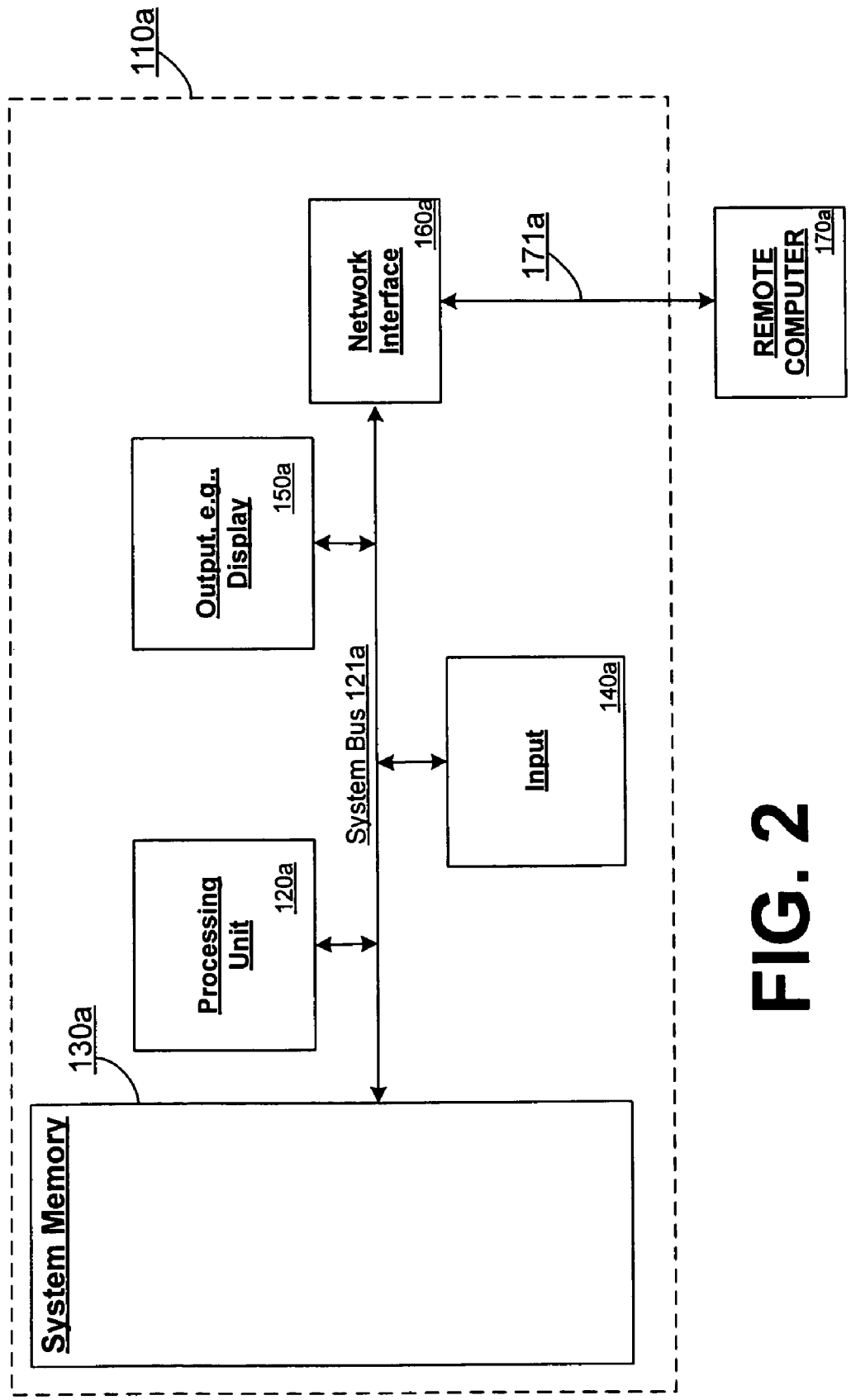
FIG. 2 is a block diagram representing an exemplary non-limiting computing system environment in which the present invention may be implemented or utilized.

FIG. 2 thus illustrates an example of a suitable computing system environment 100a in which the invention may be implemented, although as made clear above, the computing system environment 100a is only one example of a suitable computing environment and is not intended to suggest any limitation as to the scope of use or functionality of the invention. Neither should the computing environment 100a be interpreted as having any dependency or requirement relating to any one or combination of components illustrated in the exemplary operating environment 100a, or the ergonomic keyboards of the invention.

With reference to FIG. 2, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as an ergonomic keyboard provided in accordance with various embodiments of the invention and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Improvements for Ergonomic Keyboards

As mentioned, the invention relates to an improved ergonomic alphanumeric keyboard, such as may be used with a computing device, such as a personal computer, terminal, portable computer, kiosk or the like. The various ergonomic features enabled by the invention can be provided separately or in combination according to the various permutations and combinations of those features. As described in various embodiments below, not only are improved wrist postures taken into account for the improved structures and implementations of an ergonomic keyboard in accordance with the invention, but also finger tip key strike trajectories are mapped to key cap surfaces to simplify the motion to acquire keys based on key arrangement and geometry.

Thus, in one aspect of the present invention, the invention determines optimal finger to key pressing angles for keys of an ergonomic keyboard. In accordance with the invention, the angles at which fingers tend to strike key cap surfaces were studied to determine optimal independent positioning of each key cap. FIG. 3A, for instance, illustrates some exemplary non-limiting angles chosen for a plurality of independent keys. The numbers located on the keys indicate the theta angle for some exemplary non-limiting evaluations of optimal key pressing angles towards a hypothetical pressing finger that optimize access to those keys. Such exemplary, non-limiting finger tip trajectory angles also mesh, or cross pollinate, well with other aspects of the invention, such as "flattening" and "thinning" aspects of invention described in more detail below. Accordingly, the actual numerical values of the theta angles are not intended to be matched by design in accordance with the invention. Thus, FIG. 3A merely shows one non-limiting numerical implementation, while the invention is intended to encompass any numerical embodiment wherein keys are angled as optimized for finger pressing motion and angle. In various embodiments, it is noted that the keys on the periphery are struck by fingers more steeply in angle than keys closer to the center, and thus receive a new angle for an improvement.

As illustrated in exemplary fashion in FIG. 3B, the theta angle, such as $\theta_1$, may be defined as the angle made by the orthogonal line KN to the key cap surface of the key K from the orthogonal-perpendicular axis SN1 to the plane of the keyboard KP. As illustrated in exemplary fashion in FIG. 3C, the theta angle, such as $\theta_2$, may also be defined as the angle made by the orthogonal line KN to the key cap surface of the key K from the orthogonal-perpendicular axis SN2 to the plane of surface S on which the body of the keyboard rests.

Theta can be defined variously, as shown by FIGS. 3B and 3C, but the ergonomic advantage is clear—the optimal key pressing angles provided in accordance with the invention tend to be greater for the keys on the periphery of the keyboard than the keys towards the center of the keyboard, though some variation may exist within that generality due to unique positioning of keys. For instance, the keys in the columns to either side of main QWERTY typing section, such as caps lock, tab, shift, etc. tend to provide more optimal finger access when the angle to the finger is comparatively larger than the for the keys towards the center of the keyboard. Similarly, the finger strike angles in the central and front-to-back section of the keyboards tend to be optimally angled closer to perpendicular to the keyboard plane or surface upon which the keyboard rests.

As an example of the usefulness of the above observations, the fact that the "Backspace" key is a relatively far reach away on the Natural keyboard showed under observation the complex motions required to acquire and depress the Backspace key, and how inefficient such complex motions are. One has to reach not only with one's finger, but also must use hand-wrist action at the same time. By providing a more optimal angle to the finger, one's motion to strike the backspace key is thus substantially simplified. In the non-limiting embodiment illustrated in FIG. 3A, a theta angle of 18 degrees was selected for optimal pressing of the backspace key.

In other non-limiting aspects of the ergonomic keyboards of the invention, optimal range(s) are provided for "gable" angling, including, but not limited to, any range substantially centered around 12-14 degrees, such as 12 degrees, or 14 degrees, but not extending under 9 degrees or over 16 degrees, i.e., any range within about 9-16 degrees.

In this regard, a variety of alternative geometries including those of Table IA were tested and compared to the Natural keyboard design with representative computer users for performance, posture and preference metrics. A user preference for a steeper gable angle than the gable provided in preexisting keyboards, e.g., users strongly preferred a 12 degree gable instead of the Natural keyboard's 8 degree gable. One can see from Tables IA and IB below that user preference was slanted towards the steeper gable of 12 degrees of keyboard #3. The steeper gabled keyboard #3 was preferable to the Natural keyboard by a score of 2.8 to 4.2, respectively (with 1 being the "best" and 6 being the "worst").

TABLE IA

Exemplary First Evaluation of Keyboard Gable Angles

| Code # | Keyboard Design* | Opening Angle (deg.) | Gable Angle (deg.) | Split Width (mm) |
|---|---|---|---|---|
| 1 | MS Natural (prior art) | 24 | 8 | 112 |
| 2 | Narrow (Split Width) | 24 | 8 | 93 |
| 3 | Gable (Steeper) | 24 | 12 | 93 |

*Three other keyboard designs were also tested beyond the geometries of interest.

Table IA—Exemplary First Evaluation of Keyboard Gable Angles

As mentioned, the above keyboards were ranked in order of preference using values from 1 (best) to 6 (worst). The mean rankings can be seen in Table IB below.

TABLE IB

Mean Rankings of Different Keyboard Gable Angles

| Code # | Keyboard Design | Mean Preference Ranking |
|---|---|---|
| 1 | MS Natural (prior art) | 4.2 |
| 2 | Narrow (Split Width) | 3.4 |
| 3 | Gable (Steeper) | 2.8 |

Table IB—Mean Rankings of Different Keyboard Gable Angles

In another more inclusive usability study of keyboards including keyboard geometry and presentation of keys according to six different gable angles: 8 (prior art), 10, 12, 14, 16, and 18 degrees, as shown in Table II below, users exhibited an ergonomic preference for 12° and 14° gables compared to the other gables tested between 8° to 180, with the least favored gables being farthest away from the 12° or 14° gables, i.e., the 8°, the 16° and the 18° were among the least favored, with the 18° gable ranking as unacceptably gabled from a usability standpoint. Thus, for instance, the 12 and 14 degree angles were consistently selected and identified as more ergonomic than the 10 degree gable angle, which was consistently selected and identified as more-ergonomic than the 8 degree gable angle. However, this user preference for higher gable angles has its limits, as usability was shown to decrease beyond 16 degrees gable angle.

TABLE II

Exemplary Second Evaluation of Keyboard Gable Angles

| Gable Angle | Mean Preference Ranking | Percent Acceptable | Acceptable to design? |
|---|---|---|---|
| 8° | 5.2 | 77% | Acceptable |
| 10° | 3.8 | 85% | Acceptable |
| 12° | 3.5 | 92% | Acceptable |
| 14° | 2.0 | 100% | Acceptable |
| 16° | 2.6 | 77% | Acceptable |
| 18° | 3.8 | 46% | Not Acceptable |

Table II—Exemplary Second Evaluation of Keyboard Gable Angles

Figure 4A:
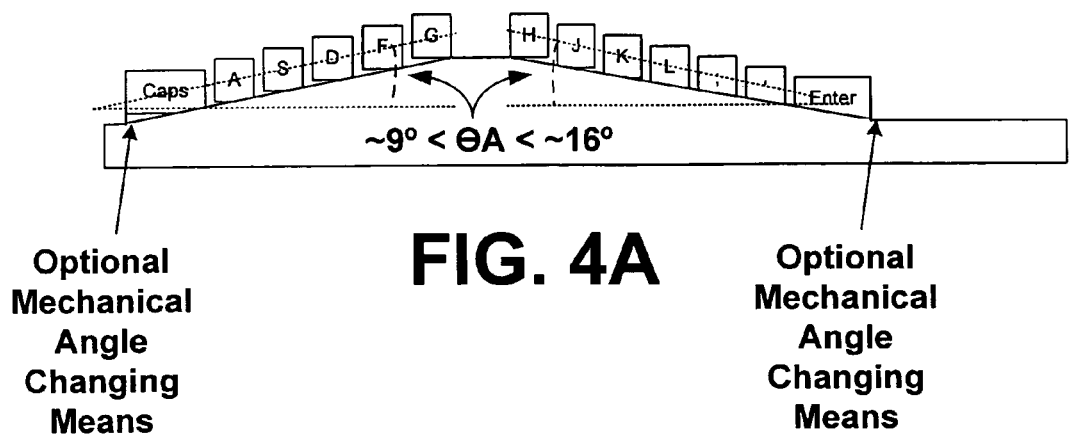
FIGS. 4A and 4B illustrate exemplary non-limiting structure(s) for or implementation(s) of gable angling in accordance with embodiments of the invention.

Accordingly, in various embodiments of the invention, as illustrated in FIG. 4A, an ergonomic keyboard is provided with split alphanumeric sections including a gable angle θA provided between about 9 degrees and about 16 degrees, with a preferred data point of approximately 14 degrees, though manufacturing ranges of about 11-15 degrees, of about 12-14 degrees and of about 10-16 degrees are contemplated for gable angle θA in accordance with the present invention as well. Additionally, sometimes there are fewer keys on the left side of an alphanumeric section than on the right side, as illustrated in FIG. 4A having a key section with six keys on the left side and a key section with seven keys on the right side. Accordingly, the present invention also contemplates an embodiment in which the gable angle θA for the left side gable is different from the gable angle θ for the right side gable, to take into account this difference in key number and corresponding key sizes, but wherein nonetheless both the left side and right side gable angle are between about 9 degrees and about 16 degrees, in accordance with the gable angling ergonomic advantages of the present invention.

Figure 4B:
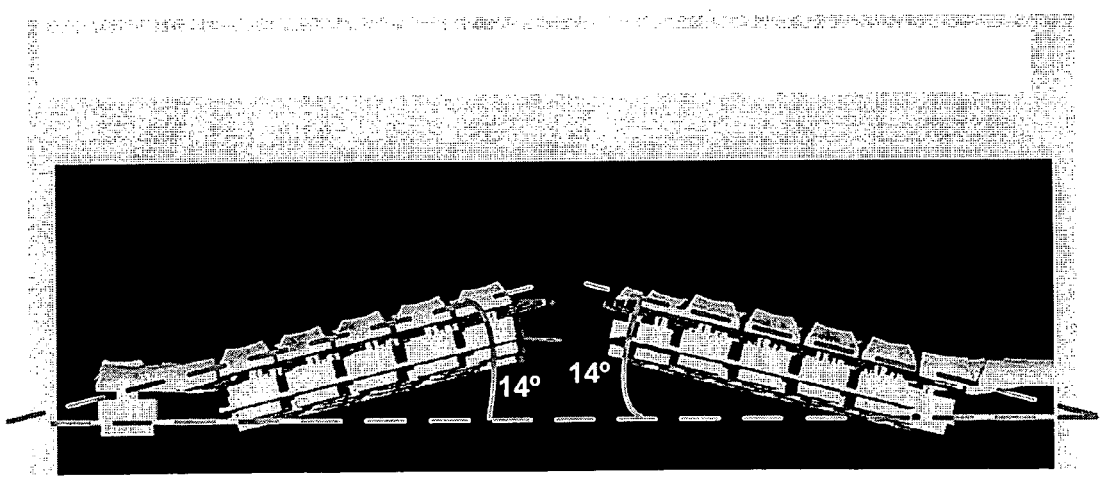

An embodiment of the invention having an optimal gable angle of 14 degrees is illustrated in FIG. 4B. As shown in FIG. 4A, an optional embodiment of the gable angling of the present invention is contemplated wherein a mechanical mechanism such as a spring, or coil, or other adjustable mechanism within the province of one of ordinary skill in the electro-mechanical arts may be provided in connection with the ergonomic keyboard in order to control the gabling angle(s) of the left and right sides of the split alphanumeric sections within any of the ranges described above. Such embodiment would be an alternative to fixing the gable angle at a predetermined value, such as 14 degrees, as shown in FIG. 4B.

In addition to the above-described gable angling, as a separate ergonomic feature for gabling split key sections of a keyboard, the invention flattens some of the keys (or parts of the keys) at or near the outer periphery of the left and right key sections. This is illustrated somewhat in FIG. 4B where the surfaces of the edge keys appear to be provided partially at the gable angle and partially flat.

Figure 5A:
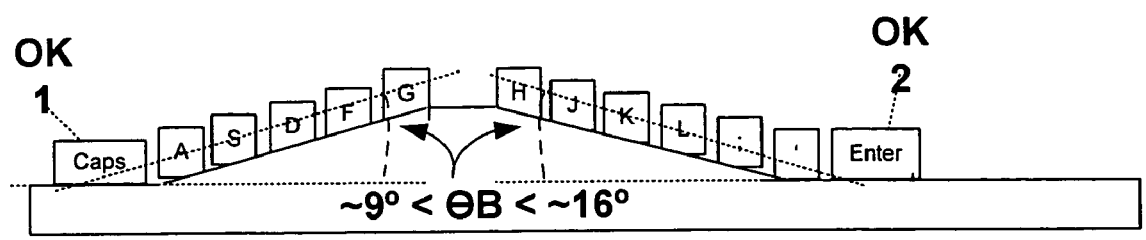
FIGS. 5A and 5B illustrate further exemplary non-limiting structure(s) for or implementation(s) of gable angling in accordance with embodiments of the invention.

Thus, as shown in FIG. 5A, in various non-limiting embodiments of an improved ergonomic keyboard of the invention, the surface of the keys on the periphery are not on the same plane as the gable, but rather on the same "flat" plane as the keys outside of the main QWERTY keys. Similarly to the embodiment of FIG. 4A, for the alternate embodiment of the invention shown in FIG. 5A, a gable angle θB is shown to apply to only a subset of the keys (or parts thereof) in a key section of an alphanumeric split keyboard design. For instance, the outer key(s) OK1 and OK2 may be on a substantially flat portion, illustrating the point that not all keys of an alphanumeric split section need be provided at the optimal gable angle in accordance with the invention. It should be noted that the above-described discussion concerning the provision of gable angle θA also applies to the provision of gable angle θB.

In addition to the above-described gable angling, as a separate ergonomic feature for gabling split key sections of a keyboard, the invention identifies an intermediate zone of keys located near the keys at the gable angle transition from substantially flat to the gable angle. For these intermediate zone keys, or "between" keys, another angle (or angles) is selected, different from the gable angle, to provide a smoother transition from the gabled keys (i.e., keys located on the plane defined by the gable angle) to the outer keys, e.g., the outer keys laying substantially flat at the outer edges of a key section (or any other keys or parts thereof near the edge). An example of such outer keys laying at the periphery of a section on a QWERTY keyboard may include the "Caps Lock" OK1 and "Enter" OK2 keys, as shown in FIG. 4B, though such periphery keys should not be limited to those keys at the edge. Sufficed to say, any number of keys, or parts thereof, of a section or row may be provided at the gable angle, any number of such keys, or parts thereof, may be provided flat towards the periphery, and in accordance with the presently described embodiment of the invention, any number of such keys, or parts thereof, may be identified as belonging to the intermediate zone, such they are provided at a transition angle smaller than the gable angle, but larger than the angle of the periphery keys.

In one non-limiting embodiment, a left gabled section and a right gabled section are provided for splitting the main QWERTY keys of an alphanumeric keyboard, and on the left gabled section, the flat keys are ~, Tab, Caps Lock, Shift, and Ctrl and on the right gabled section, the flat keys are Backspace, \, Enter, Shift and Ctrl. For another non-limiting embodiment, the transition keys for the intermediate zone are provided at half the angle of the fully gabled keys, i.e., provided at angle of 8 degrees if the gable is 16 degrees, or 7 degrees if gable is 14 degrees, and keys located on a transition from gable angle to intermediate zone, or intermediate zone to flat, have a "curved" surface to achieve a smooth transition between columns. In one non-limiting embodiment, a left gabled section and a right gabled section are provided for splitting the main QWERTY keys of an alphanumeric keyboard, and on the left gabled section, the intermediate keys are the 1, Q and A keys and on the right gabled section, the transition keys are the =, [, ' and ? keys. Other optional intermediate keys for split QWERTY key sections include the Z, ]and - keys.

Figure 5B:
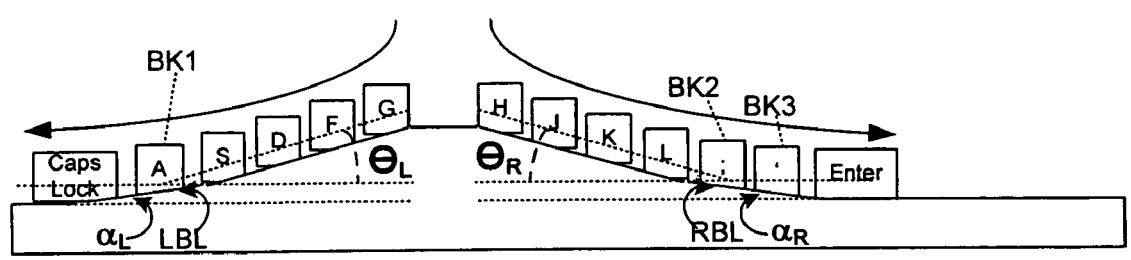

FIG. 5B illustrates how the intermediate zone keys are provided in an exemplary illustration, As shown, the left edge "Caps Lock" and right edge "Enter" keys are provided as non-gabled, or flat, keys. The S, D, F and G keys are provided at the left gable angle $\theta_L$ and the H, J, K and L keys are provided at a right gable angle $\theta_R$. Between the gabled keys and the edge keys are intermediate keys, here identified as key A BK1 on the left side and the ";" and """ keys BK2 and BK3 on the right side. As mentioned, a key may include a surface at any of the flat, intermediate angled, or gable angled orientations, or a combination of surfaces at a transition point. Thus, key BK1 is provided on left between line LBL structure angled at an intermediate angle $\alpha_L$ and keys BK2 and BK3 are provided on right between line RBL structure angled at an intermediate angle $\alpha_R$. As shown by the arrows over the keys, the overall effect is to "flatten" or smooth the edges of the gable tent, which in the prior art, was adhered to for all keys of the gabled section.

Thus, in the various non-limiting embodiments of FIGS. 5A and 5B, the invention provides structures to flatten the outer edges of the gable portion, and optionally provides structures for separate angling for "between" keys (i.e., keys between flat keys and gable angled keys).

In various other non-limiting embodiments of the invention, as illustrated in FIG. 6, in addition to the gabling angling structures and key arrangements described above in connection with FIGS. 4A, 4B, 5A and 5B, structures are provided for an ergonomic keyboard having split alphanumeric sections wherein the keys, or parts thereof, near the periphery of the keyboard are curved towards the respective sides of the keyboard, i.e., curved counterclockwise for the periphery keys of the left alphanumeric split section and curved clockwise for the periphery keys of the right alphanumeric split section. This has the overall effect of "thinning" the width of the substantially defined rectangle of the alphanumeric split sections provided in the prior art.

Figure 6A:
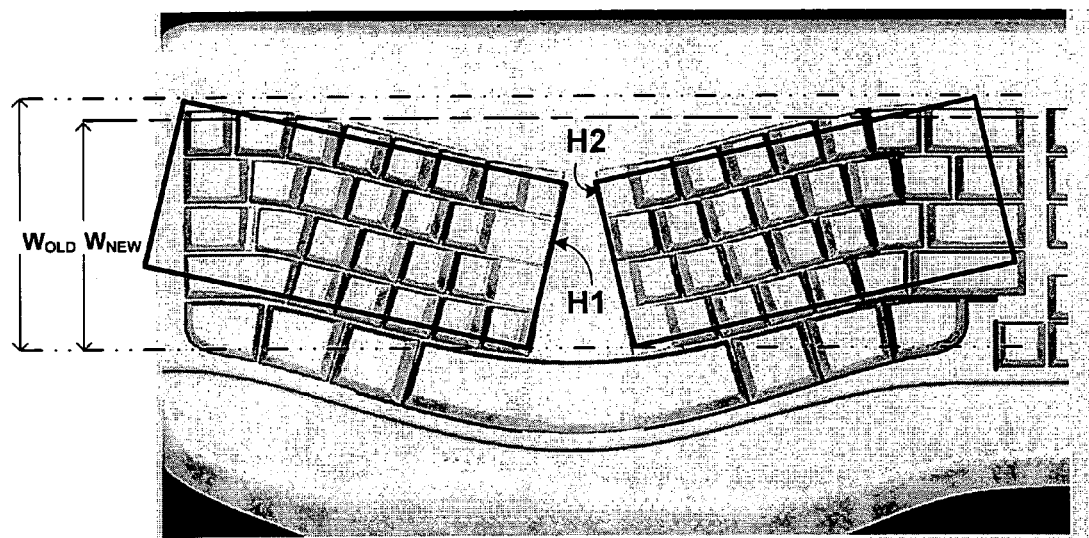
FIGS. 6A and 6B illustrate exemplary non-limiting structure(s) for or implementation(s) of curving of outer keys of split keyboard halves in accordance with embodiments of the invention.
Figure 6B:
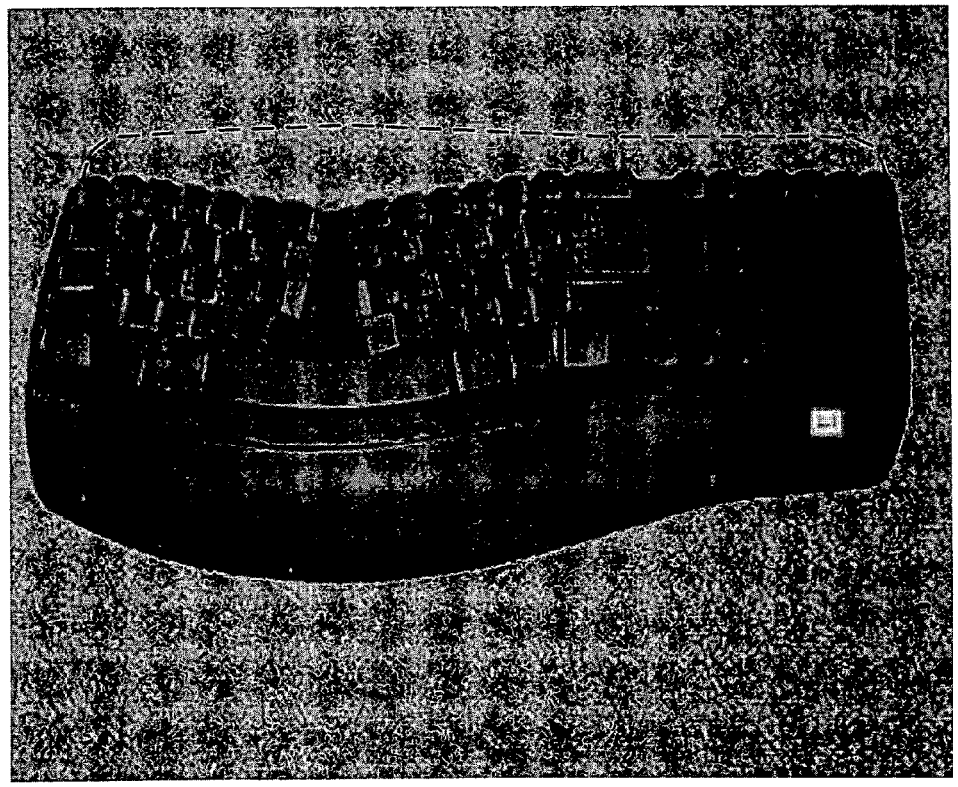

An exemplary non-limiting implementation of this concept is shown in FIG. 6A in which the periphery keys of the sections are curved outwards as described above. The prior art sectionals are superimposed in block form over the keyboard of FIG. 6A to illustrate the "thinning" difference provided by the curved periphery keys of the alphanumeric split sections in accordance with the presently described embodiments of the invention. In essence, the width $W_{OLD}$ of the prior art rectangular sections with no curving is wider than the width $W_{NEW}$ of the curved key sections in accordance with the invention. Such curving may be provided to alphanumeric split sections independent of, or in combination with, any of the above-described gabling structures, angles and techniques in accordance with the invention. Thinning the alphanumeric split sections has the ergonomic benefit of bringing the farthest keys from the user closer to the extent of the thinning. FIG. 6B illustrates another non-limiting exemplary embodiment of an ergonomic keyboard that includes thinned alphanumeric split sections, curved at the periphery as described above.

Figure 7:
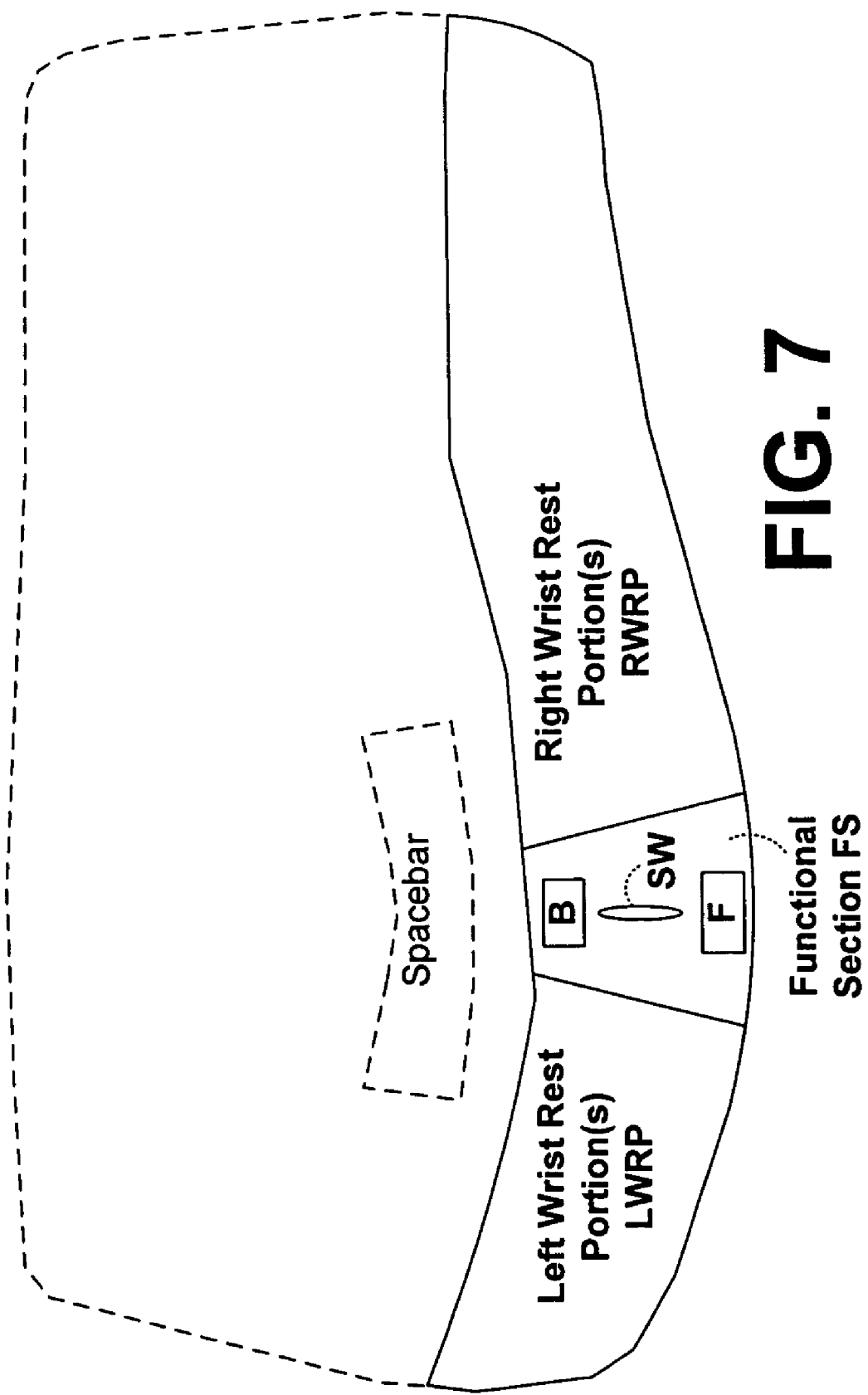
FIG. 7 illustrate exemplary non-limiting structure(s) for or implementation(s) of multiple wrist rest areas in accordance with embodiments of the invention.

In still other non-limiting embodiments of the invention, as illustrated in FIG. 7, a wrist rest for a keyboard is provided which includes at least one wrist rest component for the left wrist LWRP and at least one wrist rest component for the right wrist RWRP. Between portions LWRP and RWRP, the invention recognizes that this area is unused from an ergonomic standpoint because the area between the thumbs tends to be placed to no use when typing. Accordingly, in still further non-limiting embodiments of the invention, and as shown in FIG. 7, a function section FS may be optionally provided in accordance with the invention which may optionally include any (non-key) functional mechanism suited for keyboard input, including, but not limited to, scroll bars or wheels, microphones, LEDs, touchpads for a standalone keyboard, zoom, mouse buttons, volume control, navigation control, launch keys, buttons, slider, track ball, media playback UI components (play, pause, stop, mute), etc. such that the unused area of a classic QWERTY keyboard located substantially between the thumbs may be utilized for special purpose by the user of the keyboard, such as to scroll through a Web site, navigate music, etc.

With these optional implementations of a keyboard in accordance with the invention, the wrist rest structures RWRP and LWRP may be any type of wrist rest structures, such as affixed wrist rest, detachable wrist rest, or any adjustable wrist rest described in accordance with any embodiments herein, or otherwise generally known to those of ordinary skill in the wrist rest art, and may be made with any material, such as plastic, gel, fabric, etc. Thus, any non-alphanumeric, non-editing, non-function and non-number pad key may be placed in the "dead" space between the user's hands in accordance with the invention. Advantageously, the gable of the above-described embodiments provides area for a printed circuit board in the keyboard that may be leveraged in connection with the functionality provided by the buttons B, scroll bar or wheel SW, or functions F of FIG. 7.

Figure 8A:
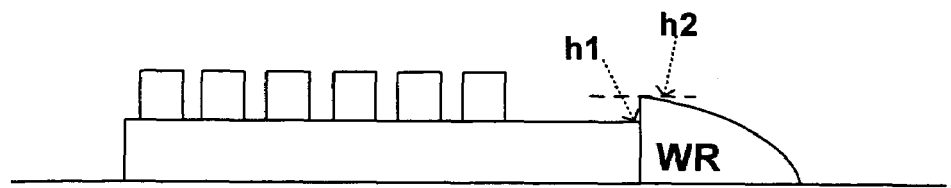
FIGS. 8A, 8B, 8C and 8D illustrate exemplary non-limiting structure(s) for or implementation(s) of an adjustable wrist rest in accordance with embodiments of the invention.

In still further non-limiting embodiments of the invention, as illustrated in FIG. 8A, a wrist rest for a keyboard is provided affixed or attached at an elevated position with respect to the front edge of the body of the keyboard. For instance, the height of the wrist rest is h2 and the height of the front edge of the keyboard is h1. In accordance with the invention, h2 is provided at a level higher than h1. In keeping with a user preference to avoid extension as shown in FIG. 1F, elevating the wrist rest alleviates some of the extensional difficulties created by enforcing the condition that the front edge of the keyboard body be level with the height of the wrist rest as done in the prior art.

Figure 8B:
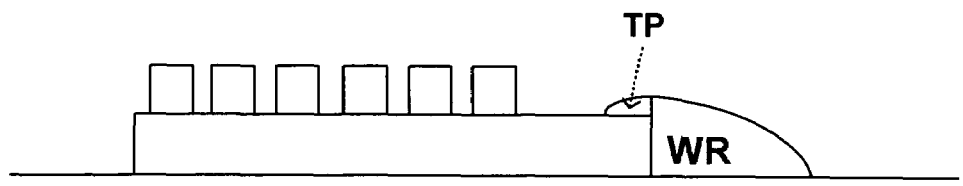
Figure 8C:
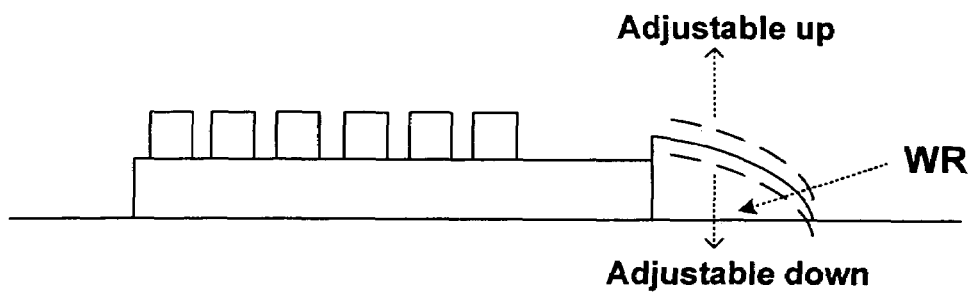
Figure 8D:
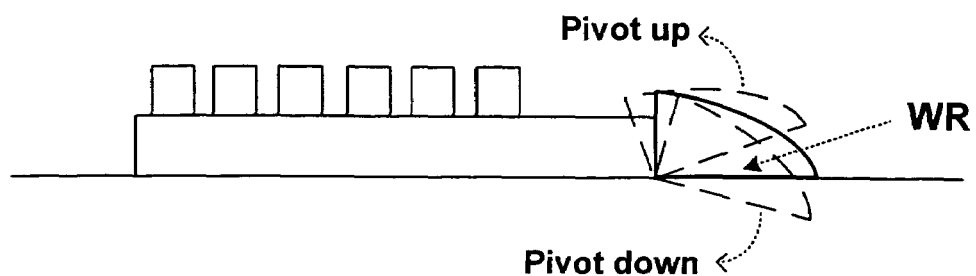

Alternate embodiments of an elevated wrist rest are shown in FIGS. 8B to 8D as well. In FIG. 8B, for instance, a transition portion TP is provided that smoothes the wrist rest to the body of the keyboard at the transition between the wrist rest and the keyboard body, since the wrist rest may form an angle where the wrist would uncomfortably rest.

In FIG. 8C, an adjustable vertical extension mechanism is provided to elevate, and also optionally lower the wrist rest according to user preference, since not all wrist geometries are the same. Similarly, in FIG. 8D, a pivoting mechanism is provided about a pivot point that similarly enables the raising and lowering of a wrist rest according to the pivoting action of the pivoting mechanism. The pivot point may be selected to be anywhere at or near where the keyboard body interfaces the wrist rest. The embodiments of FIGS. 8C and 8D may be combined to provide pivoting and vertical extension simultaneously, or independently. Accordingly, a user's wrists may be elevated to provide a more natural and comfortable resting position for the hands of a keyboard typist.

Thus, to minimize wrist extension, the invention enables as a first option an adjustable (pivotally or vertically) wrist rest to raise or lower the wrist rest to an optimal position as defined by the user, or enables as a second option the attachment of the wrist rest at an optimal level higher than the front edge of the keyboard. Various different heights were compared, as shown in Tables IIIA to IIIB below, in determining that a height of about 7 mm above the front edge of the keyboard is optimal for palm rest height.

TABLE IIIA

Exemplary Evaluation of Palm or Wrist Rest Height

| Palm Rest Height | Rank (higher = better) |
|---|---|
| +7 mm | 8.5 |
| Current (0 mm) | 6.8 |
| +14 mm | 6.3 |
| +21 mm | 4.4 |

TABLE IIIB

First User Study for Varying Wrist Rest Height

| Height | % Preference | % Unacceptable | Acceptable to design? |
|---|---|---|---|
| Current | 38% | 0% | Acceptable |
| +7 mm | 54% | 0% | Acceptable |
| +14 mm | 8% | 31% (4/13) | Acceptable |
| +21 mm | 0% | 92% (12/13) | Not Acceptable |
| +28 mm | 0% | 92% (12/13) | Not Acceptable |

TABLE IIIC

Second User Study for Varying Wrist Rest Height

| Height | Total Average Score (lower = better) | Percent Acceptable | Acceptable to design? |
|---|---|---|---|
| 0 mm | 2.8 | 62% | Acceptable |
| 7 mm | 2.0 | 92% | Acceptable |
| 10 mm | 2.0 | 77% | Acceptable |
| 14 mm | 3.2 | 38% | Not Acceptable |

In one non-limiting embodiment, the invention provides a series of replaceable palm rests at various pre-fixed heights above the present surface of the keyboard. Compared to current design, the heights are selected at levels of 7, 10, and 14 mm above the current height.

The adjustable palm rest may or may not extend to the number pad area. In one embodiment of this ergonomic feature, the palm rest height for the section of the wrist rest near the number pad remains lower than the level selected for the rest of the wrist rest.

In a non-limiting preferred embodiment of the invention, an adjustable palm rest is provided having up to 10 mm above the current even leveled design, with an acceptable range from 0 mm to between 7 mm and 10 mm. The adjustable palm rest may be continuous or incremental segmented in its implementation of heights from 0 mm to 10 mm. In various embodiments, the palm rest surface angles more negatively as it is raised higher to present a support surface for the palm of the hand as wrist extension decreases.

One of ordinary skill in the art can appreciate that there are a myriad of ways to raise or lower the palm rest, as described above. A non-exhaustive list of ways to do this include providing dual pivoting legs on a free standing palm rest to allow for multiple height adjustments, providing a pivoting fin on the backside of the palm rest, providing a telescoping foot "cup," providing a paddle release on the side of palm rest that locks and unlocks, providing an internal motor gear that drives the palm rest up and down, providing a scoop detail on the keyboard surface that allows for a flush fit regardless of palm rest height, providing a twist dial that cranks the palm rest up and down, providing a rotating dial that moves a worm drive, providing an up/down dial that moves the palm rest up and down, providing top access feet on a palm rest that press down to increase height, providing palm rest feet that pivot out and pivoting the entire palm rest about the front edge of the keyboard, providing a bar linkage that articulates the palm rest, providing multiple slots on the keyboard that allow the palm rest to "plug" into a desired location, providing side adjusted telescoping feet, providing a side paddle that moves the palm rest only near the main QWERTY section, and not the number pad, providing an air pump that increases the height, providing multiple peg locations that allow for height adjustment, providing palm rest pivots about the back edge center point that locks into place with a foot stop, providing a dual bar linkage that moves the palm rest in both the y and z axes, providing a detachable peg foot that plugs into multiple locations on the bottom of the pivoting palm rest, and providing a palm rest perimeter made of flexible skirt material to compensate for the gap created when the height is increased. Other techniques may be employed as well.

Figure 9A:
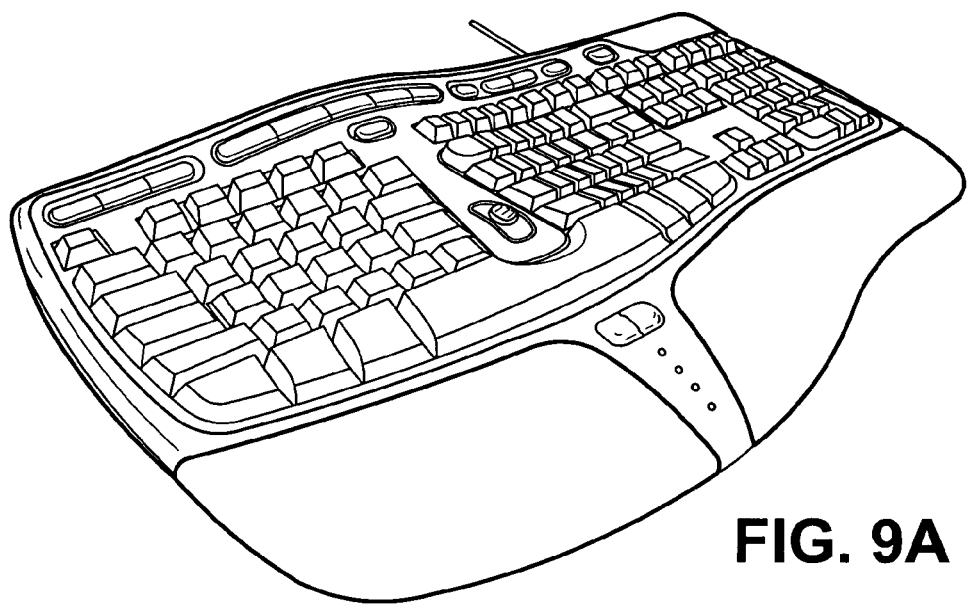
FIGS. 9A, 9B and 9C illustrate an exemplary non-limiting design of a keyboard incorporating one or more features of the various embodiments of ergonomic keyboards in accordance with the invention.
Figure 9B:
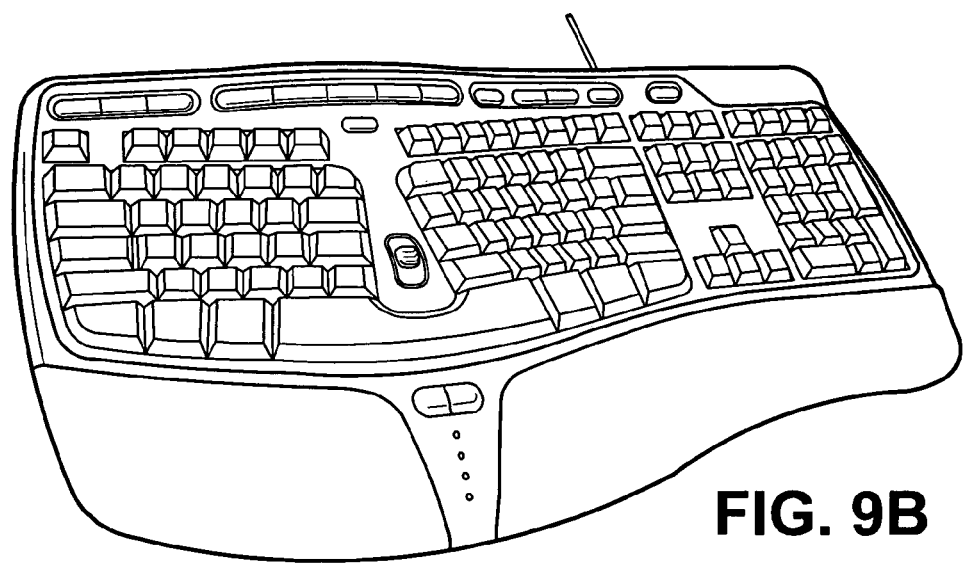
Figure 9C:
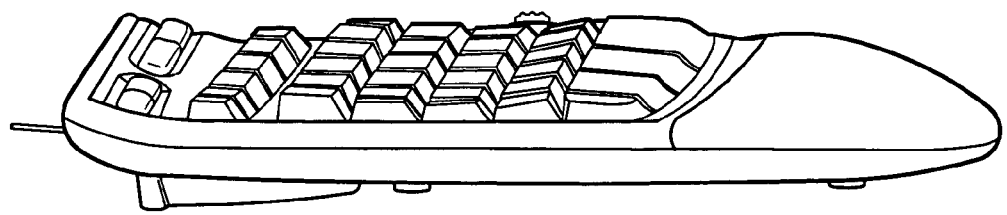

FIGS. 9A to 9C illustrate a first perspective view, a second perspective view and a side view of an embodiment of an ergonomic keyboard in accordance with the invention, incorporating one or more of the above-described features of the invention. It should be understood that FIGS. 9A to 9C illustrate but one non-limiting implementation of one or more of the embodiments of the above-described features, and that all permutations and combinations of any of the above-described features are considered within the spirit of the improved ergonomic keyboards of the invention.

Where appropriate, any of the various structures and techniques described herein may be implemented in connection with hardware, including electro mechanical parts, or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, such as any of the embodiments of an ergonomic keyboard of the invention, and at least one output device. However, the program(s) can be implemented in assembly or machine language, if desired. In any case, the language may be a compiled or interpreted language, and combined with hardware implementations.

While one or more of the various non-limiting features of an ergonomic keyboard of the invention have been described in the context of at least one usability study that demonstrated the efficacy of the various structure(s) and implementation(s) of the invention, when used by people, it is to be understood that it is the various structural aspects enabled by the invention and described above that provide the usefulness thereof. Additionally, while the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed is:

1. An alphanumeric keyboard having a pre-defined key arrangement, wherein the pre-defined key arrangement includes:
    at least one QWERTY typing section comprising:
    a plurality of central keys;
    a plurality of intermediate keys disposed outboard of the plurality of central keys;
    one or more peripheral keys disposed outboard of the plurality of intermediate keys;
    wherein the central, intermediate, and peripheral keys are arranged into rows;
    wherein the plurality of central keys of each row are configured such that each central key is provided at a same gable angle and disposed along a substantially straight reference line inclined at said same gable angle with respect to a plane of the keyboard; and
    the one or more peripheral keys of each row are configured such that each peripheral key is provided on a substantially flat portion relative to the plane of the keyboard and the one or more intermediate keys on each row are configured such that each intermediate key is provided at a transition gable angle and disposed along a second substantially straight reference line inclined at said transition gable angle with respect to the plane of the keyboard, the transition gable angle being smaller than the gable angle.

2. A keyboard according to claim 1, wherein the at least one QWERTY typing section includes:
    a first QWERTY typing section including central keys provided at a first same gable angle with respect to a plane of the keyboard that is substantially in the range of about 9 degrees to about 16 degrees; and
    a second QWERTY typing section including central keys provided at a second same gable angle that is substantially in the range of about 9 degrees to about 16 degrees.

3. A keyboard according to claim 2, wherein the first QWERTY typing section is on the left side of the keyboard for a user's left hand and the second QWERTY typing section is on the right side of the keyboard for the user's right hand, and the first same gable angle for the left side is different than the second same gable angle for the right side.

4. A keyboard according to claim 3, wherein the first and second QWERTY typing sections are split open; and wherein at least one row in each of the first and second QWERTY typing sections is curved such that the keys near the periphery are curved toward the respective side of the keyboard, thereby thinning the width of a quasi-rectangle substantially defined by the key section.

5. A keyboard according to claim 1, wherein said same gable angle is substantially in the range of about 12 degrees to about 14 degrees.

6. A keyboard according to claim 5, wherein said same gable angle is one of about 12 degrees or about 14 degrees.

7. A keyboard according to claim 1, wherein said same gable angle is substantially in the range of about 11 degrees to about 15 degrees.

8. A keyboard according to claim 1, further including an adjustable mechanism for adjusting the same gable angle.

9. A keyboard according to claim 1, wherein the transition angle is half of the same gable angle.

10. A keyboard according to claim 1, wherein the intermediate keys of each row are configured such that each intermediate key is provided at said same gable angle and disposed along said reference line inclined at said same gable angle with respect to a plane of the keyboard.

11. A keyboard according to claim 10, wherein the peripheral keys of each row are configured such that each peripheral key is provided at said same gable angle and disposed along said reference line inclined at said same gable angle with respect to a plane of the keyboard.

12. A keyboard according to claim 10, wherein the peripheral keys of each row are configured such that each peripheral key is provided at a substantially zero gable angle.

13. A keyboard according to claim 1, wherein the intermediate keys of each row are configured such that each intermediate key is provided at a same second gable angle, wherein said same second gable angle is smaller than the same gable angle of the central keys.

14. A keyboard according to claim 13, wherein the peripheral keys of each row are configured such that each peripheral key is provided at said same second gable angle.

15. A keyboard according to claim 13, wherein the peripheral keys of each row are configured such that each peripheral key is provided at a substantially zero gable angle.

16. A keyboard according to claim 1, wherein the central keys of each row are disposed on a same plane inclined at said same gable angle with respect to a plane of the keyboard.

17. An alphanumeric QWERTY keyboard having a pre-defined key arrangement, wherein the pre-defined key arrangement for the main QWERTY portion of the keys includes:

at least one key section comprising:

a first subset of keys including a plurality of keys, wherein each key of the first subset of keys is provided on a substantially straight plane inclined at a first non-zero gable angle with respect to a plane of the keyboard;

wherein said first non-zero gable angle is substantially in the range of about 9 degrees to about 16 degrees;

a second subset of one or more keys located outboard of the first subset of keys, wherein each key of the second subset of one or more keys is provided on a plane inclined at a substantially zero gable angle; and an intermediate subset of one or more keys located substantially between the first subset of keys and the second subset of keys;

wherein each key of the intermediate subset is provided on a substantially straight plane inclined at a second non-zero gable angle;

wherein the second non-zero gable angle is smaller than the first non-zero gable angle provided for the first subset of keys, with respect to a plane of the keyboard.

18. A keyboard according to claim 17, wherein at least one of the intermediate keys includes at least a first surface and a second surface, wherein either (A) the first surface is provided at the first non-zero gable angle and the second surface is provided at the second non-zero gable angle or (B) the first surface is provided at the second non-zero gable angle and the second surface is provided at the substantially zero angle.

* * * * *